INVENTOR.
KENNETH W. EXWORTHY
BY Charles J. Ungemach
ATTORNEY

United States Patent Office 3,427,540
Patented Feb. 11, 1969

3,427,540
ELECTROSTATIC VOLTMETER HAVING VARIOUS SIZED INPUT ELECTRODES TO PROVIDE PLURAL RANGES
Kenneth W. Exworthy, Minneapolis, Minn., assignor to Honeywell Inc., Minneapolis, Minn., a corporation of Delaware
Filed Sept. 21, 1965, Ser. No. 488,867
U.S. Cl. 324—109
Int. Cl. G01r 19/16
1 Claim

ABSTRACT OF THE DISCLOSURE

An automatically rebalanced electrostatic voltmeter employing differential capacitor deflection sensing means and electrostatic rebalancing. Two embodiments show digital and analog voltage readouts.

The present invention pertains to means for measuring electric signals. More particularly, the present invention pertains to means for accurately measuring DC and AC electrical voltages.

The art of voltmeters is crowded with a multitude of design variations, each design attempting to minimize some particular source of error in the measurement of electric voltages. Many of these designs are successful in their attempt to minimize a particular problem, but in doing so generally must comprise and give rise to other problem sources. These instruments are useful and give improved performance for certain applications while for other applications they are completely inadequate. The voltmeter described here is especially well adapted for applications where the measurement speed must be high, where the instrument must have a high impedance, where the output must be linear and where there is a necessity for high accuracy.

The apparatus of the present invention is comprised of a sealed envelope containing a balanced movable vane, input electrodes, rebalance electrodes, displacement sensing electrodes, and a fluid medium. A voltage signal applied to one of the input electrodes produces a force on the vane, turning the vane from a null position. The resulting motion of the vane produces a voltage output at the displacement sensing electrodes. This voltage output is processed by stabilizing electronics which provide the proper electrical transfer function to stabilize the system. A rebalancing source is also provided for producing a continuous sequence of pulses of known area. In response to the voltage signal at the displacement sensing electrodes, the pulses from the rebalance voltage source are applied to the rebalance electrodes, producing a force which moves the vane back to the null position. The net number of pulses required to rebalance the vane to the null position is counted and the resulting number is proportional to the applied voltage at the input electrode. If the applied voltage is DC, the count is proportional directly to the amplitude of the DC voltage. If the applied voltage is AC, however, the count is proportional to the true RMS value of the voltage.

The advantages of this instrument are that the errors due to mechanical non-linearity are insignificant, the measurement speed can be very high, it has very high input impedance, and the accuracy can be to .1% or better. The instrument can also be easily connected to print-out or other digital readout mechanism.

It is, therefore, an object of the present invention to provide an instrument for measuring DC and true RMS voltages.

A further object of the present invention is to provide an accurate voltmeter with high speed of response.

Figure 2:
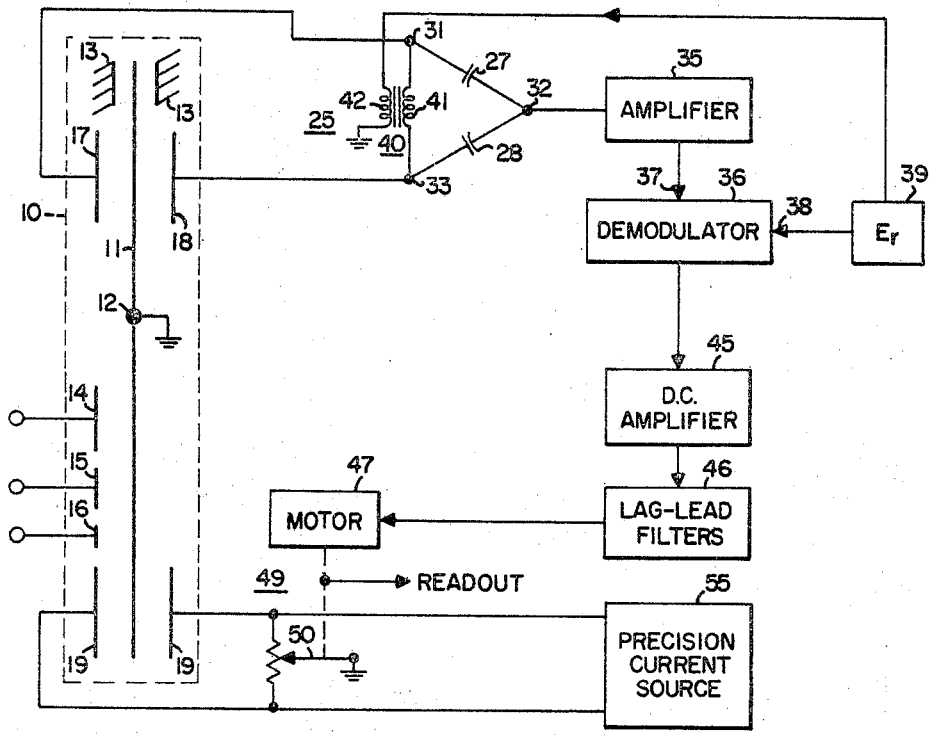
Figure 1:
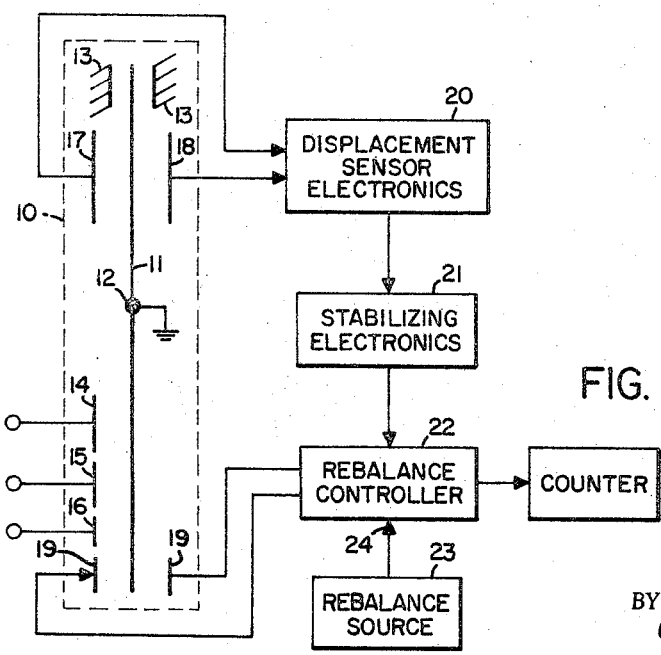

These and further objects will become apparent to those skilled in the art upon examination of the following specification, claims, and drawing, of which:

FIGURE 1 is a schematic representation of the apparatus of the present invention; and FIGURE 2 is a schematic representation of an alternate embodiment of the present invention.

Referring now to FIGURE 1, sensor 10 is comprised of an electrically conductive vane 11 mounted on a pivot 12 for rotation about pivot 12. A plurality of input electrodes 14, 15, and 16 are mounted adjacent to vane 11. A pair of rebalance electrodes 19 are positioned adjacent to vane 11, and also adjacent to vane 11 are a pair of displacement sensing electrodes 17 and 18. A pair of stops 13 are provided at one end of vane 11 to limit the maximum angular rotation of the vane. The movable vane is essentially a plate of a capacitor, variable with respect to input electrodes, sensor electrodes, and rebalance electrodes.

Sensor electrodes 17 and 18 provide a measure of the angular displacement of vane 11 as a function of capacitance variation. These two electrodes are connected to displacement sensor electronics 20 which may be a bridge/demodulator, a frequency/discriminator, oscillator/phase detector, or any similar arrangement which develops bi-directional voltage output responsive to the motion of the vane. The output of the displacement sensor electronics is applied to the input of stabilizing electronics 21. Sensor 10 and the rebalance electronics constitutes a system which has a definite frequency response characteristic. In order to stabilize this system, the phase of the feedback quantity must be closely controlled. This is done by means of stabilizing electronics 21 which may include electrical filters. The signal from stabilizing electronics 21 is used to control the voltage on rebalance electrodes 19. This may be done in a number of ways, for example, by the controlled pulse method discussed above, or the motor driven pot method illustrated in FIGURE 2. In addition to receiving the signal from stabilizing electronics 21, rebalance controller 22, in FIGURE 1, receives an input from rebalance source 23. An output signal indicative of the voltage at input electrodes 14, 15, or 16 appears at the output of rebalance controller 22.

In the embodiment of FIGURE 1, rebalance source 23 provides output pulses of known area. As vane 11 is deflected from its normal null position due to a voltage signal applied at one of its input electrodes 14, 15, or 16, this displacement is detected by sensing electrodes 17 and 18 in conjunction with displacement sensor electronics 20. A signal which is a function of this displacement appears at output of sensor electronics 20 and is applied to the input of stabilizing electronics 21, whose function it is to stabilize the entire system. Rebalance controller 23 receives at one of its inputs the signal from the output of stabilizer electronics 21 and receives at a second input the pulses from rebalance source 23. Rebalance controller 22 acts as a valve, allowing just the proper number of pulses from rebalance source 23 to pass on to electrodes 19 to establish an electric charge on electrodes 19 which results in an electrostatic force of just the right magnitude to move vane 11 back to its normal null position. The net number of pulses required to establish this balance is directly proportional to the magnitude of the input voltage signals at input electrodes 14, 15, or 16. This same number of pulses appears at the output of rebalance controller 22 shown connected to a counter and may be used as a direct indication of the voltage being measured, or may be utilized for any other purpose desired.

In FIGURE 2, the displacement sensor electronics, identified in FIGURE 1 by the numeral 20, are comprised of a capacitive bridge 25, an amplifier 35, demodulator 36, and an AC reference signal source 39. Bridge circuit 25 is comprised of capacitors 27 and 28 connected between terminals 31 and 32, 32 and 33 respectively. The third and fourth legs between terminals 31 and 33 consists of a differentially variable capacitor comprised of sensing electrodes 17 and 18 and vane 11. Terminals 31 and 33 of capacitive bridge 25 are connected to sensing electrodes 17 and 18 respectively. A secondary winding 41 of a transformer 40 is connected across the diagonal bridge circuit 25 between terminals 31 and 33. Transformer 40 has a primary winding 42 connected at one end to a ground terminal and at its other end to an output of reference signal source 39. Terminal 32 of bridge circuit 25 is connected to the input of amplifier 35.

Demodulator 36 has an input 37 connected to the output of amplifier 35 and an input 38 connected to receive the referenced signal from reference signal source 39. The output signal of demodulator 36 is a DC signal whose amplitude is proportional to the displacement of vane 11 from its normal orientation. This DC signal is applied to an input of DC amplifier 45. The output signal of amplifier 45 is applied to lag-lead filters 46, which are provided for the purpose of stabilizing the system.

The DC output signal of lag-lead filters 46 is applied to drive a motor 47. The mechanical output of motor 47 is utilized to drive wiper arm 50 of potentiometer 49. Potentiometer 49 has a resistive element connected between a pair of rebalance electrodes 19 positioned adjacent movable vane 11, and is further connected across the output of a precision current source 55. Motor 47 drives wiper 50 until electric voltages on rebalance electrodes 19 are such to create forces which will drive vane 11 back to its normal preferred orientation. The mechanical output of motor 47 is, in turn, also a direct indication of the voltages present at input electrodes 14, 15, or 16. A plurality of input electrodes of different sizes are provided to give the voltmeter a capability over a wide range.

Many variations and embodiments are possible in the scope of this invention. It is understood, therefore, that the specific embodiment disclosed and discussed here are for the purpose of illustration only and that my invention is limited only by the scope of the appended claim.

I claim:
1. An apparatus for measuring electric signals, said apparatus comprising:

an electrically conductive vane mounted on a pivot for rotation about said pivot, said vane having a preferred angular orientation;

a plurality of input electrodes of different areas positioned adjacent said movable member each for receiving an input signal whose magnitude is to be measured and for creating an electric force between said input electrode and said movable vane as a function of the amplitude of said input signal and the area of the input electrodes;

differential capacitive pickoff means for detecting the displacement of said movable vane;

rebalance means including at least one differential rebalance electrode positioned adjacent said movable member and a source of high frequency uniform pulses, said rebalance means receiving a signal from said pickoff means and supplying a controlled number of pulses from said source to said rebalance electrodes such that the resulting electrode charge on said rebalance electrode exerts a force on said movable member of exactly proper magnitude and direction to return said member to its preferred orientation; and a counting means connected to said rebalance means for counting the number of pulses supplied to said rebalance electrodes, said number being a digital indication of the input signal amplitude.

References Cited

UNITED STATES PATENTS

| 2,794,955 | 6/1957 | Rich | 324—109 |
| 2,942,187 | 6/1960 | Erath et al. | 324—109 |
| 2,968,952 | 1/1961 | Stolder | 73—517 |
| 3,211,003 | 10/1965 | Worden | 73—141 XR |
| 3,226,979 | 1/1966 | De Boice | 73—517 |

FOREIGN PATENTS 856,173  11/1952  Germany.

RUDOLPH V. ROLINEC, *Primary Examiner.*

E. F. KARLSEN, *Assistant Examiner.*

U.S. Cl. X.R.

324—99, 115